United States Patent
Chappus et al.

(10) Patent No.: US 9,522,421 B2
(45) Date of Patent: Dec. 20, 2016

(54) BAR MOUNTED TOOL ADAPTOR

(71) Applicant: NORGREN AUTOMATION SOLUTIONS, LLC, Saline, MI (US)

(72) Inventors: Corey Chappus, Armada, MI (US); James R. Kalb, Petersburg, MI (US); Michael A. Filipiak, Ann Arbor, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 317 days.

(21) Appl. No.: 14/179,583

(22) Filed: Feb. 13, 2014

(65) Prior Publication Data

US 2015/0226374 A1    Aug. 13, 2015

(51) Int. Cl.
*F16D 1/00*        (2006.01)
*B21D 43/05*       (2006.01)
*B23Q 3/00*        (2006.01)
*B23Q 7/00*        (2006.01)
*B23Q 7/04*        (2006.01)
*B23Q 1/54*        (2006.01)
*B25J 15/00*       (2006.01)

(52) U.S. Cl.
CPC ........... *B21D 43/052* (2013.01); *B23Q 1/5462* (2013.01); *B23Q 3/00* (2013.01); *B23Q 7/00* (2013.01); *B23Q 7/04* (2013.01); *B25J 15/0061* (2013.01); *Y10T 29/49998* (2015.01); *Y10T 29/53091* (2015.01); *Y10T 29/53961* (2015.01); *Y10T 29/53974* (2015.01); *Y10T 29/53978* (2015.01); *Y10T 29/53983* (2015.01); *Y10T 29/53991* (2015.01); *Y10T 403/7094* (2015.01); *Y10T 483/132* (2015.01); *Y10T 483/134* (2015.01)

(58) Field of Classification Search
CPC ........... B23Q 3/00; B23Q 1/5462; B23Q 7/04; B23Q 7/00; Y10T 29/53983; Y10T 29/53974; Y10T 29/53961; Y10T 29/49998; Y10T 29/53991; Y10T 29/53978; Y10T 29/53091; Y10T 483/134; Y10T 483/132; B25J 15/0061; B21D 43/055; B21D 43/052
USPC ....... 403/353, 345, 348, 359.6, 360; 29/721; 414/749.6, 751.1, 749.1; 483/8, 9, 901, 483/902; 901/41
See application file for complete search history.

(56) References Cited

U.S. PATENT DOCUMENTS

| | | | | |
|---|---|---|---|---|
| 4,768,895 | A | * | 9/1988 | Ludwig ............... F16C 11/0614 188/321.11 |
| 5,024,575 | A | * | 6/1991 | Anderson ............. B65G 47/90 294/2 |
| 5,284,366 | A | * | 2/1994 | Herberman ............ F16L 37/00 285/148.27 |

(Continued)

*Primary Examiner* — Chi Q Nguyen
(74) *Attorney, Agent, or Firm* — Young Basile Hanlon & MacFarlane P.C.

(57) ABSTRACT

A tool support structure includes a tool rail that extends in an axial direction, a first mounting portion that is connected to the tool rail, and a second mounting portion that is connected to the tool rail at a location along the tool rail that is spaced from the first mounting portion in the axial direction. The second mounting portion includes a lug and an aperture. The lug has a shaft portion and a head portion that is located outward from the shaft portion. The shaft portion is receivable within a slot on the base and the head portion restrains transverse removal of the lug from the slot when the shaft portion is disposed within the slot. The aperture is adapted to receive a pin on the base to resist rotation of the tool rail with respect to the base.

20 Claims, 5 Drawing Sheets

(56) References Cited

U.S. PATENT DOCUMENTS

| | | | |
|---|---|---|---|
| 5,733,097 A * | 3/1998 | Herbermann | B21D 43/055 294/65 |
| 5,746,567 A | 5/1998 | Herbermann et al. | |
| 5,909,998 A | 6/1999 | Herbermann et al. | |
| 5,951,389 A * | 9/1999 | Hettes | B24B 45/006 403/343 |
| 6,244,814 B1 | 6/2001 | Herbermann et al. | |
| 6,416,273 B1 * | 7/2002 | Herbermann | B21D 43/055 414/749.1 |
| 6,540,188 B2 * | 4/2003 | Jenkins | F16B 1/00 248/276.1 |
| 6,626,629 B2 | 9/2003 | Herbermann et al. | |
| 6,860,705 B1 * | 3/2005 | Dietrich | B23Q 3/00 414/680 |
| 6,863,323 B2 * | 3/2005 | Neveu | B25J 15/0052 294/65 |
| 7,748,107 B2 | 7/2010 | Hurst et al. | |
| 8,024,852 B1 | 9/2011 | Hurst et al. | |
| 8,122,581 B1 | 2/2012 | Hurst et al. | |
| 8,931,594 B2 * | 1/2015 | Kreller | E04G 1/14 182/113 |
| 2010/0089697 A1 * | 4/2010 | Kreller | E04G 1/14 182/113 |

* cited by examiner

BAR MOUNTED TOOL ADAPTOR

CROSS-REFERENCE TO RELATED APPLICATIONS

Not Applicable

BACKGROUND

This invention generally relates to a tool mounting system for a workpiece transfer system. More particularly, this invention relates to a tool mounting system mountable to a workpiece transfer system.

A workpiece transfer system includes a bar that moves a workpiece between desired locations. Often the workpiece transfer system will move body panels between stamping stations. Tools such as grippers or vacuum cups are attached to the bar and grasp a workpiece at one location and release the workpiece at another location. The tools often utilize pressurized air for actuation and therefore need numerous pneumatic couplings and conduits that are attached to the bar.

In many applications of workpiece transfer systems, the clearance between the bar and the stamping station is limited. Accordingly, each part must fit within certain defined space restrictions. This includes the pneumatic and electrical wires that supply and control actuation of the gripper and vacuum tools.

Further, it is often the case with many transfer systems that multiple workpiece configurations are fabricated within the same line. The stamping dies are changed over along with the tooling required to move the workpieces between stations. Rigidly attached tooling makes change over difficult and time consuming.

Accordingly, it is desirable to design a transfer system that provides for switching of tooling while remaining within the space limitations of the transfer system.

SUMMARY

One aspect of the disclosed embodiments is a tool support structure that includes a tool rail that extends in an axial direction, a first mounting portion that is connected to the tool rail, and a second mounting portion that is connected to the tool rail at a location along the tool rail that is spaced from the first mounting portion in the axial direction. The second mounting portion includes a lug and an aperture. The lug has a shaft portion and a head portion that is located outward from the shaft portion. The shaft portion is receivable within a slot on the base and the head portion restrains transverse removal of the lug from the slot when the shaft portion is disposed within the slot. The aperture is adapted to receive a pin on the base to resist rotation of the tool rail with respect to the base.

Another aspect of the disclosed embodiments is a tool support structure that includes a tool rail that extends in an axial direction, a first mounting portion that is connected to the tool rail, and a second mounting portion that is connected to the tool rail at a location along the tool rail that is spaced from the first mounting portion in the axial direction. The second mounting portion includes a lug and a pin, the lug having a shaft portion and a head portion that is located outward from the shaft portion. The shaft portion is receivable within a slot on the base, and the head portion restrains transverse removal of the lug from the slot when the shaft portion is disposed within the slot. The pin is adapted to be received in an aperture on the base to resist rotation of the tool rail with respect to the base.

Another aspect of the disclosed embodiments is a mounting structure for connection to a base. The mounting structure includes a base portion, a head portion, and a shaft portion. The shaft portion connects the head portion to the base portion and is receivable in a slot on the base such that the head portion and the base portion restrain transverse removal of the shaft portion from the slot. The mounting structure also includes at least one of a pin or an aperture that is engageable with the other of a pin or an aperture on the base to resist rotation with respect to the base.

BRIEF DESCRIPTION OF THE DRAWINGS

The various other uses of the present invention will become more apparent by referring to the following detailed description and drawings in which.

DETAILED DESCRIPTION

Figure 1:
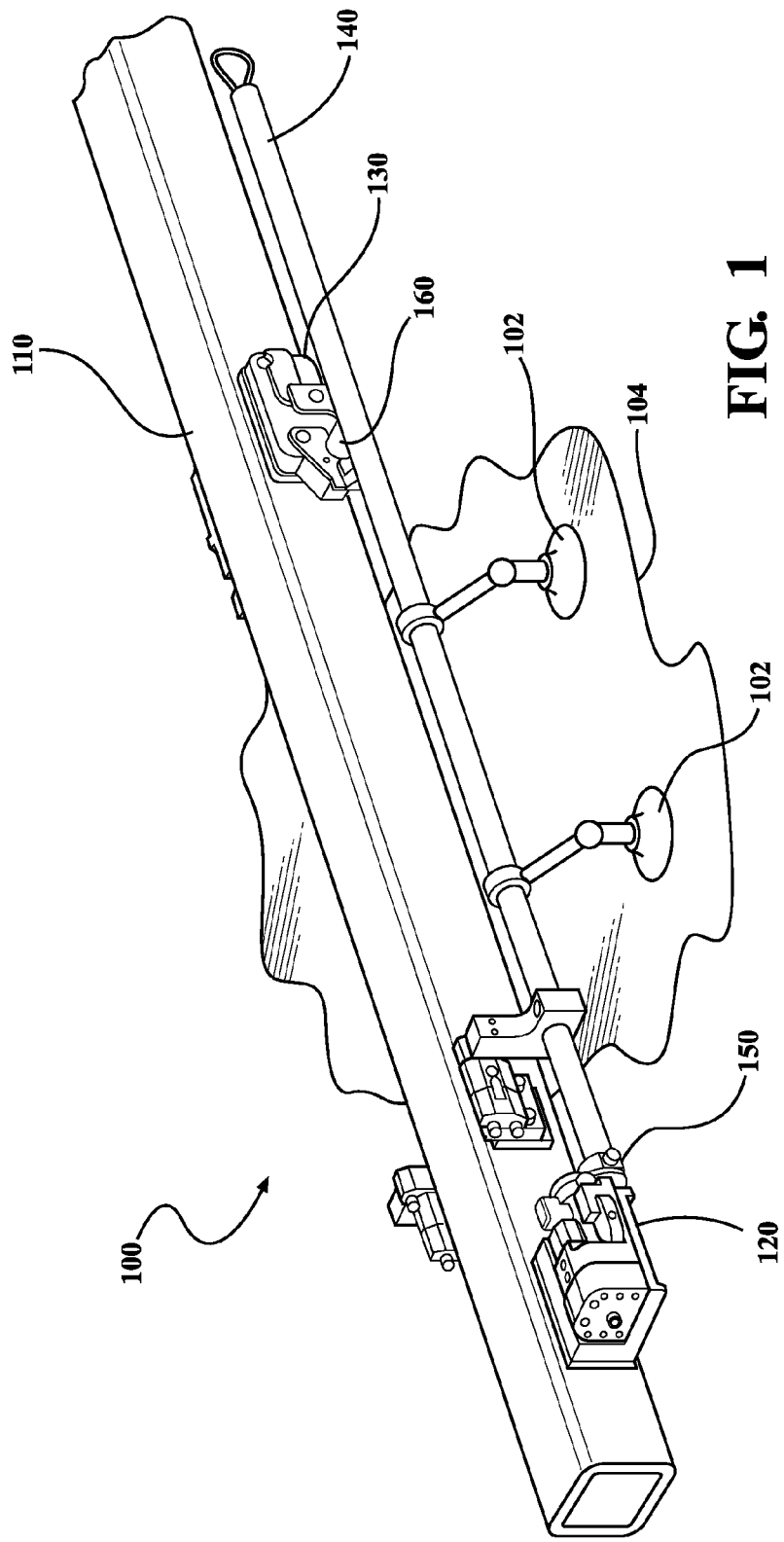
FIG. 1 is a perspective view showing a workpiece transfer system.

FIG. 1 shows a workpiece transfer system 100 that can be utilized to move a workpiece 104 between workstations (not shown). The workpiece transfer system 100 can include a base, such as a bar 110, and a tool support structure that is connectable to the base, such as a tool rail 140. A plurality of mounting portions are connected to the tool rail 140 and allow the tool rail 140 to be connected and disconnected with respect to the base, as will be discussed herein. The tool rail 140 supports one or more tools 102, thereby allowing the tools to be connected and disconnected with respect to the bar 110. The tools 102 in the illustrated example are pneumatically actuated suction cups. However, other tools as are known that can be supported by the tool rail 140, such as mechanical grippers and part present sensing devices.

The bar 110 is connectable to an automated motion control system, such as a robotic arm (not shown) to allow movement of the workpiece transfer system 100. In order to allow connection of the tool rail 140 to the bar 110, a plurality of mounting structures can be formed on or connected to the bar 110. The mounting structures can include a mount plug receiver 120 that is connected on or formed on the bar 110 and a lug mount 130 that is connected on or formed on the bar 110.

The tool rail 140 is an elongate structure that extends in an axial direction. As examples, the tool rail 140 can be an elongate tubular structure having any desired cross-sectional shape, such as circular, square, rectangular, or polygonal, and can have smooth exterior surfaces or include surface features, such as serrations or splines.

To connect the tool rail 140 to the mount plug receiver 120, a mount plug 150 is located at a first end of the tool rail 140. The mount plug 150 can extend in the axial direction of the tool rail 140 and can extend axially outward from the first end of the tool rail 140. The mount plug 150 can be moved between a connected position and a disconnected position with respect to the mount plug receiver 120. In one implementation, at least a portion of the movement of the mount plug 150 between the disconnected position and the connected position is movement in the axial direction of the tool rail 140. The mount plug 150 can be lockable with respect to the mount plug receiver 120, for example, by a selectively engageable latch or other structure that is incorporated in the mount plug receiver 120.

In some implementations, the mount plug receiver 120 and the mount plug 150 can cooperate to define electrical and/or pneumatic connections between the bar 110 and the tool rail 140. Alternatively, electrical and/or pneumatic connections between the bar 110 and the tool rail 140 can be provided elsewhere along the tool rail 140.

In order to connect the tool rail 140 to the lug mount 130, the tool rail 140 can include a lug 160.

Figure 2:
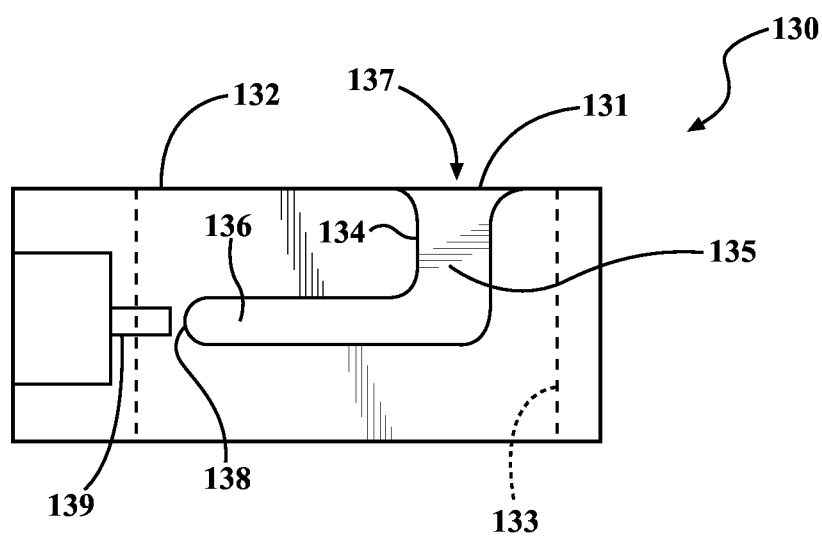
FIG. 2 is a side view showing a lug mount.

FIG. 2 is an illustration showing the lug mount 130. The lug mount 130 includes an inner plate 131 that is spaced apart from an outer plate 132 to define a recess 133 that is located between the inner plate 131 and the outer plate 132. A slot 134 includes a first portion 135 that forms an angle, such as a 90° angle, with respect to a second portion 136. The first portion 135 of the slot 134 can extend from an open end 137 to an intersection with the second portion 136. The second portion 136 can extend from the intersection with the first portion 135 to a closed end 138.

The lug mount 130 can include at least one of a pin or an aperture, where the other of a pin or an aperture is provided on the tool rail 140. In the illustrated example, the lug mount 130 includes a pin 139. The pin 139 can be configured such that it extends in the axial direction of the tool rail 140 when the tool rail 140 is connected to the lug mount 130. Also, the pin 139 and the second portion 136 of the slot 134 can extend in a common direction.

Figure 3:
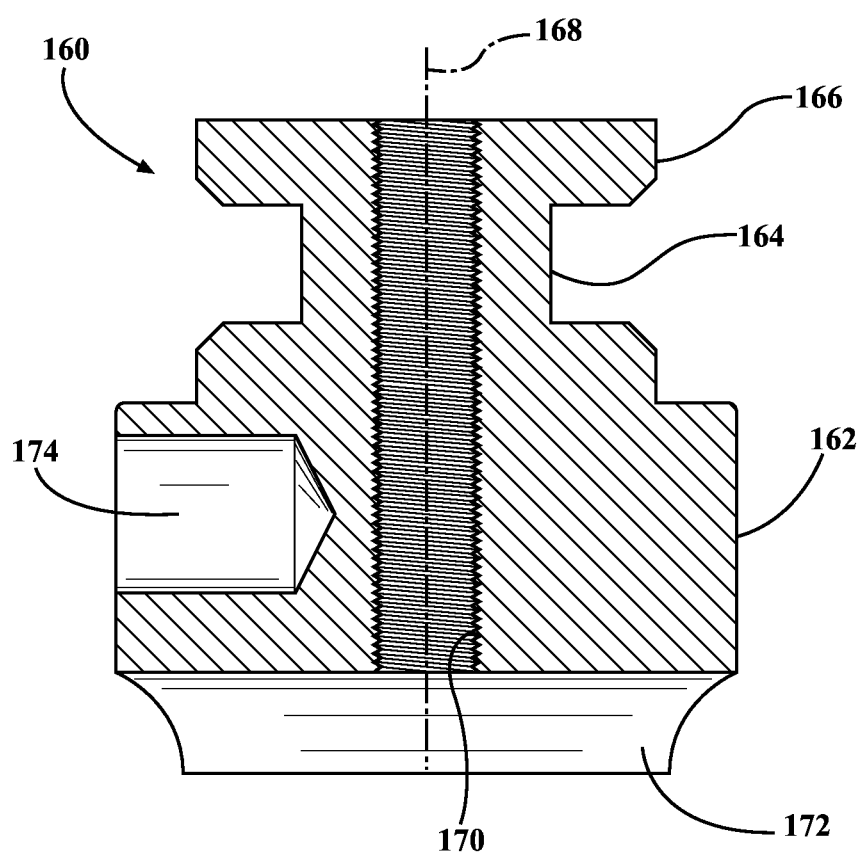
FIG. 3 is a cross-section view showing a lug.

As shown in FIG. 3, the lug 160 can include a base portion 162, a shaft portion 164, and a head portion 166. Each of the base portion 162, the shaft portion 164, and the head portion 166 can be substantially circular. However, other shapes could be utilized for the base portion 162, the shaft portion 164, and the head portion 166.

The shaft portion 164 is adapted to be received in the slot 134 of the lug mount 130 and has a width or diameter that is smaller than the width or diameter of the head portion 166. The shaft portion 164 can also have a width or diameter that is smaller than the width or diameter of the base portion 162. In addition, the base portion 162, the shaft portion 164, and the head portion 166 can extend along a common axis 168. A threaded aperture 170 can be formed through the lug 160 and can also extend along the common axis 168.

In order to allow connection of the lug 160 to the tool rail 140, the lug 160 can have a contoured surface 172 on the bottom of the base portion 162, wherein the contoured surface is contoured complimentary to the shape of the tool rail 140. For example, the contoured surface 172 can be substantially arcuate.

The lug 160 can include an aperture 174. In the illustrated example, the aperture 174 is formed in the base portion 162 of the lug 160. The aperture 174 can extend substantially transverse to the common axis 168, such that it is open to a peripheral surface of the base portion 162 of the lug 160. The aperture 174 is adapted to receive the pin 139 of the lug mount 130. In alternative implementations, it is not necessary that that lug 160 include the aperture 174. Instead, in some implementations, the lug 160 can include at least one of a pin or an aperture, wherein the lug mount 130 includes the other of a pin or an aperture.

Figure 4A:
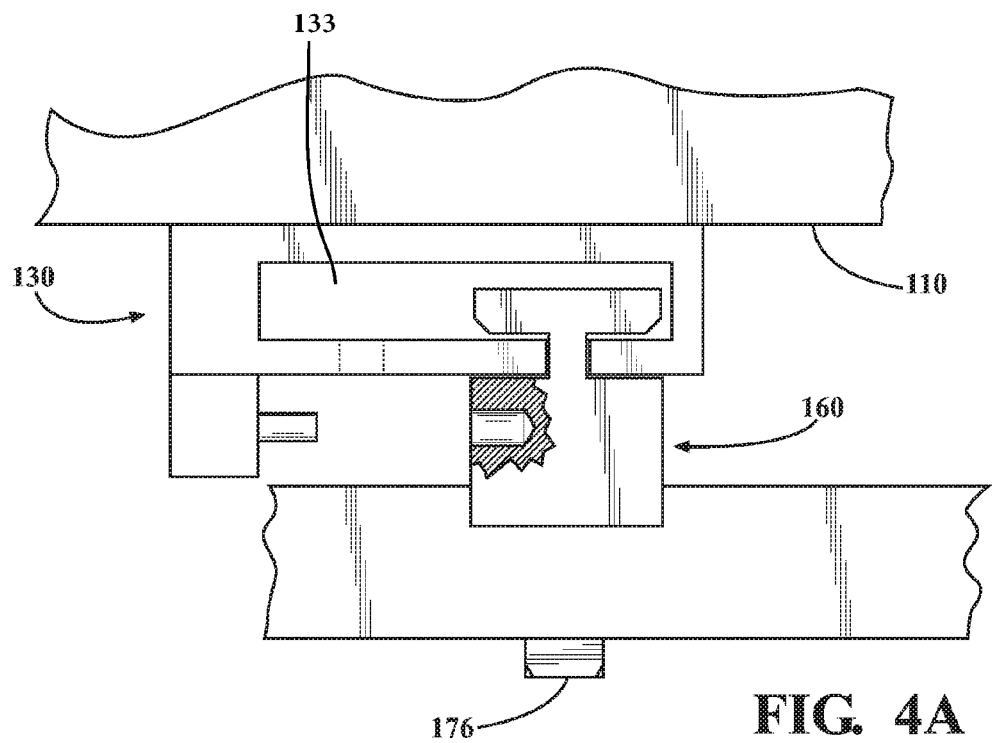
FIG. 4A is a top view showing the lug in a disconnected position with respect to the lug mount.
Figure 4B:
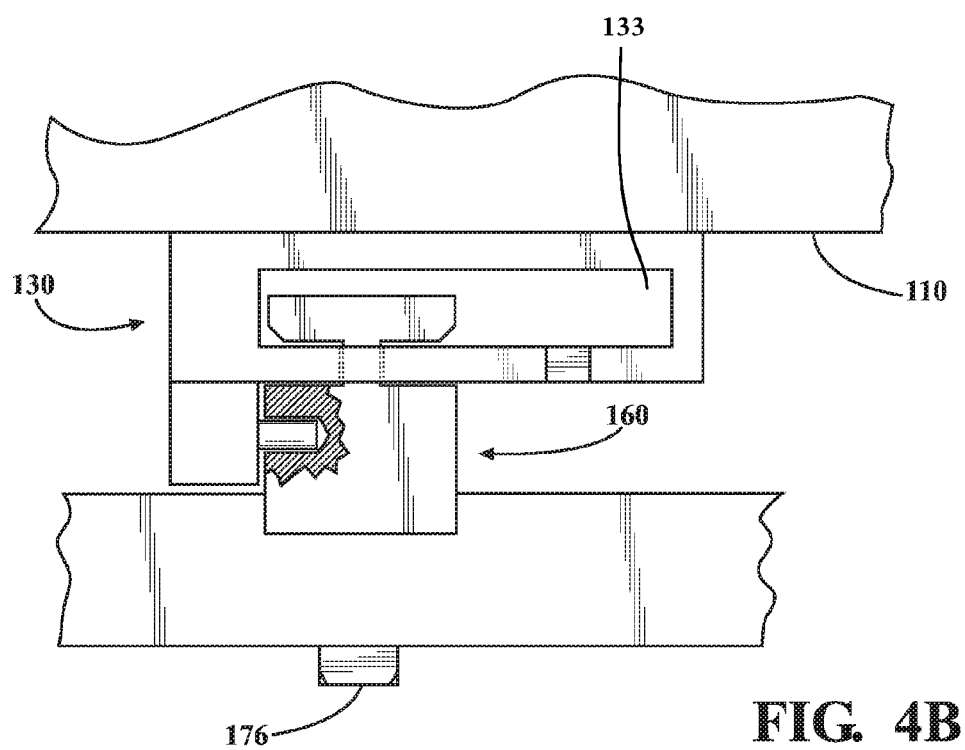
FIG. 4B is a top view showing the lug in a connected position with respect to the lug mount.

As shown in FIGS. 4A-4B, the tool rail 140 can be connected to the bar 110 by moving the lug 160 and the lug mount 130 from a disconnected position (FIG. 4A) to a connected position (FIG. 4B) with respect to one another. In order to connect the lug 160 to the tool rail 140, a fastener 176 can extend through the tool rail 140 and be received in the threaded aperture 170 of the lug mount 130.

Initially, the lug 160 is positioned such that the shaft portion 164 is adjacent to the open end 137 of the lug mount 130. The lug 160 is then moved downward with respect to the lug mount 130 such that the shaft portion 164 enters the first portion 135 of the slot 134, and the head portion 166 enters the recess 133. Once the shaft portion 164 of the lug 160 reaches the second portion 136 of the slot 134, the tool rail 140 and the lug 160 can be moved in the axial direction of the tool rail 140 until the shaft portion 164 of the lug 160 reaches the closed end 138 of the slot 134. As the lug 160 moves in the axial direction, the pin 139 of the lug mount 130 enters the aperture 174 of the lug 160.

When the lug 160 and the lug mount 130 are in the connected position (FIG. 4B), the head portion 166 and the base portion 162 of the lug 160 are engageable with the lug mount 130 to restrain transverse removal of the lug 160 from the slot 134 since the width or diameter of the base portion 162 and the head portion 166 are larger than the width of the slot 134 such that the lug 160 can only be removed from the slot 134 at the open end 137 thereof. In addition, in cooperation with engagement of the lug 160 with the slot 134, rotation of the tool rail 140 and the lug 160 with respect to the lug mount 130 is restrained by engagement of the pin 139 of the lug mount with the aperture 174 of the lug 160.

Figure 5A:
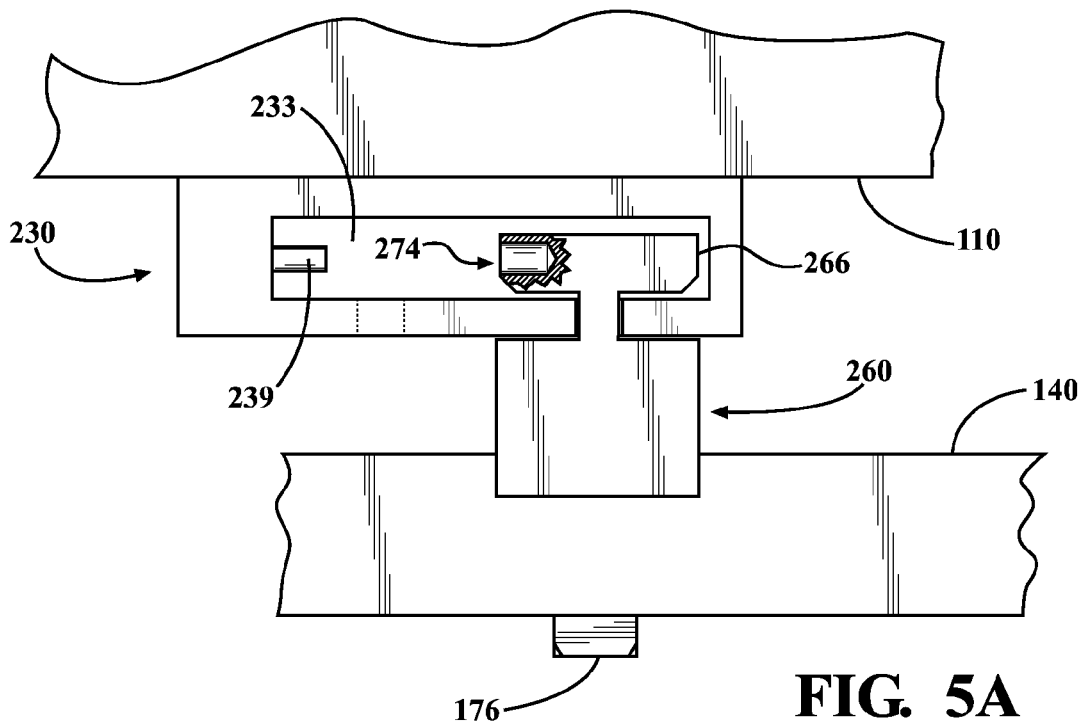
FIG. 5A is a top view showing a first alternative lug in a disconnected position with respect to a first alternative lug mount.
Figure 5B:
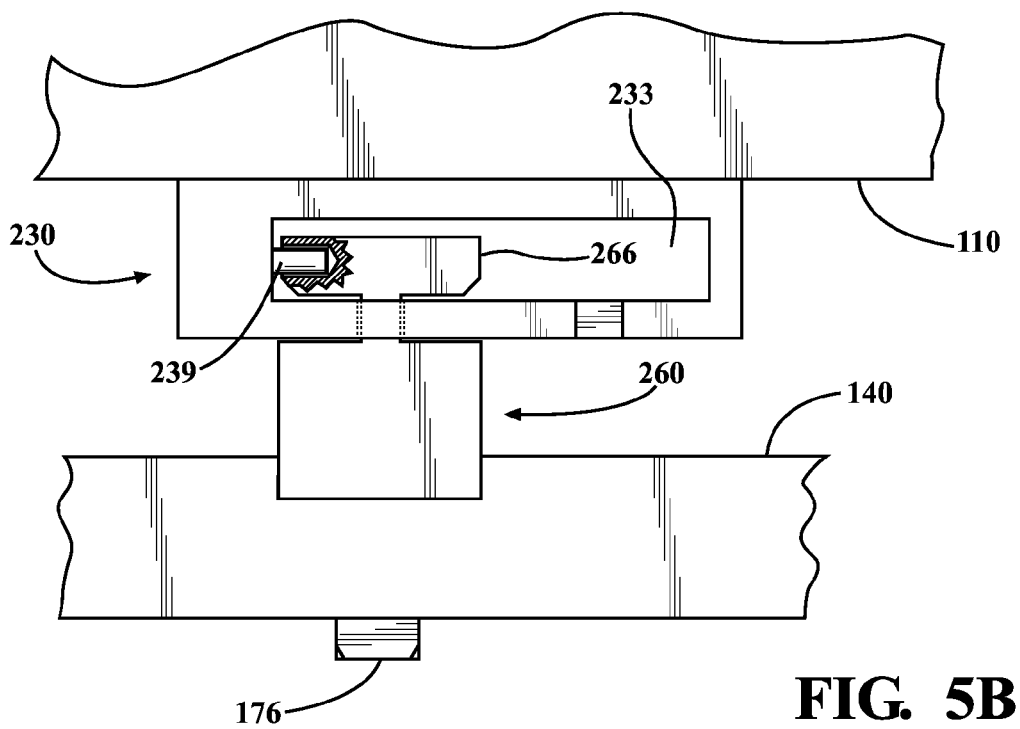
FIG. 5B is a top view showing a first alternative lug in a connected position with respect to a first alternative lug mount.

FIGS. 5A-5B show a disconnected position (FIG. 5A) and a connected position (FIG. 5B) of a first alternative lug 260 with respect to a first alternative lug mount 230. The first alternative lug mount 230 is identical to the lug mount 130, with the exception that a pin 239 is disposed within a recess 233 of the first alternative lug mount 230. The first alternative lug 260 is identical to the lug 160 with the exception that an aperture 274 is formed in a head portion 266 of the first alternative lug 260. Movement and operation of the first alternative lug mount 230 and the first alternative lug 260 is substantially as described in connection with the lug mount 130 and the lug 160.

Figure 6A:
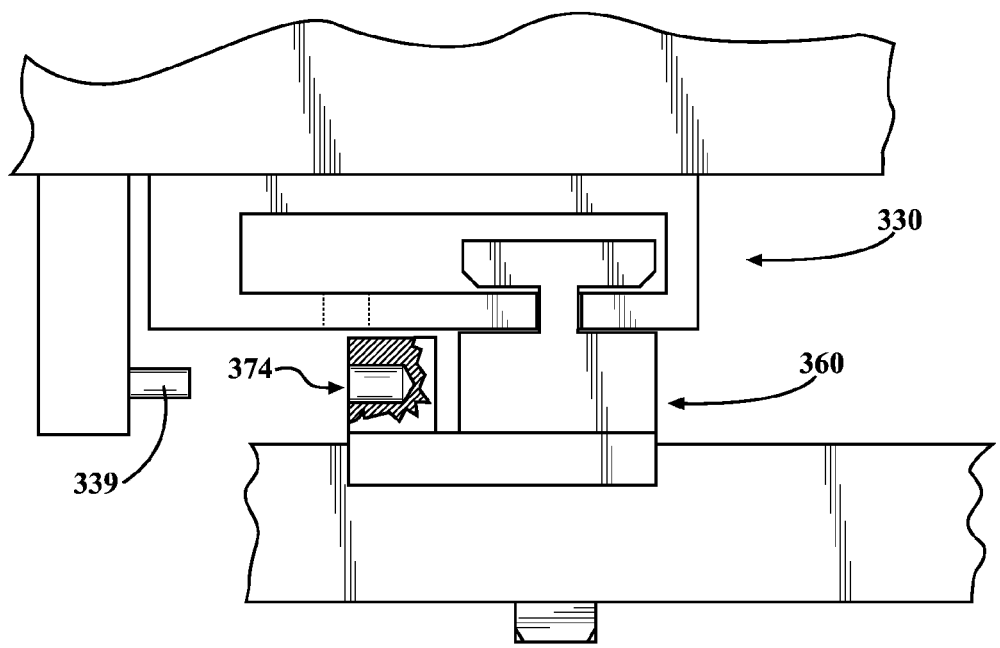
FIG. 6A is a top view showing a second alternative lug in a disconnected position with respect to a second alternative lug mount.
Figure 6B:
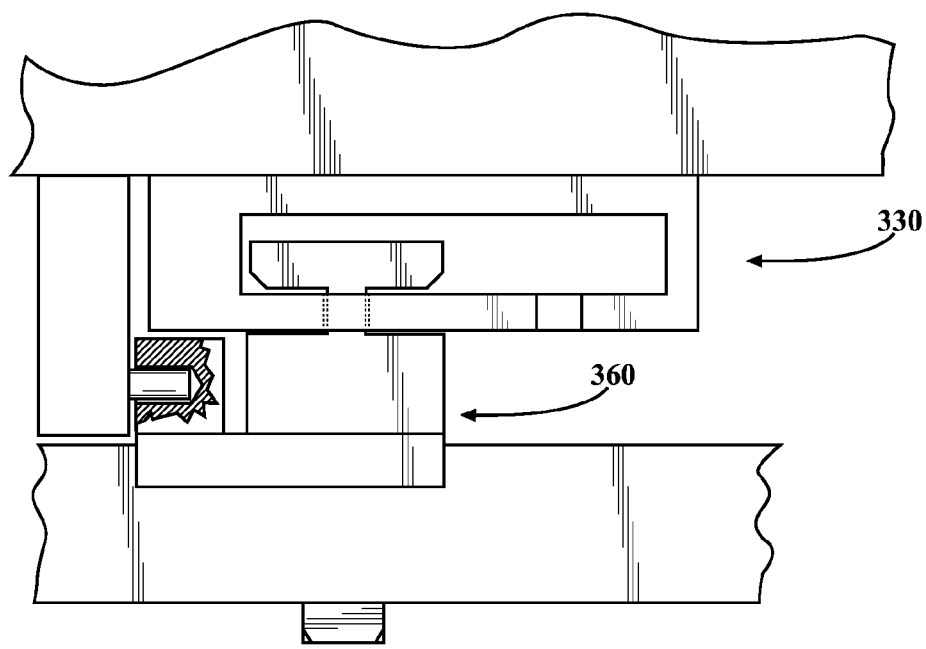
FIG. 6B is a top view showing a second alternative lug in a connected position with respect to a second alternative lug mount.

FIGS. 6A-6B show a disconnected position (FIG. 6A) and a connected position (FIG. 6B) of a second alternative lug mount 330 with respect to a second alternative lug 360. The second alternative lug mount 330 is similar to the lug mount 130, with the exception that the pin 339 need not be formed on the second alternative lug mount 330 but instead can be formed on a separate structure. The second alternative lug 360 is similar to the lug 160 with the exception that the aperture 374 is not formed in the second alternative lug 360 but, instead, can be formed in a second structure. Movement and operation of the second alternative lug mount 330 with respect to the second alternative lug 360 is substantially as described with respect to the lug mount 130 and the lug 160.

In operation, the tool rail 140 is adapted to be connected and disconnected with respect to a base, such as the bar 110. The tool rail 140 is initially positioned with respect to the bar 110 such that a first mounting portion of the tool rail 140, such as the mount plug 150, is positioned adjacent to a complementary mounting structure on the bar 110, such as the mount plug receiver 120. At the same time, a second mounting portion of the tool rail 140, such as the lug 160, is positioned adjacent to a complementary mounting structure on the bar 110, such as the lug mount 130. The lug 160 is first moved into the open end 137 of the slot 134 in a downward motion that is substantially transverse to the axial direction of the tool rail. The tool rail 140 is then moved along its axial direction, causing the mount plug 150 to become disposed within and locked with respect to the mount plug receiver 120 as the lug 160 approaches the closed end 138 of the slot 134 and the pin 139 enters the aperture 174. Disconnection of the tool rail 140 with respect to the bar 110 is performed by unlocking the mount plug 150 with respect to the mount plug receiver 120 and reversing the motion performed during connection. Use of other implementations, such as those including the first alternative lug mount 20 and the first alternative lug 260 or those including the second alternative lug mount 330 and the second alternative lug 360, is performed in the same manner.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A tool support structure for connection to a base, comprising:
    a tool rail; and
    a lug that has a lug axis, is connected to the tool rail, and is connectable to the base, the lug having:
        a base portion that is adjacent to the tool rail and has a first width that is measured in a transverse direction that extends perpendicular to the lug axis,
        a shaft portion that extends along the lug axis, is located outward from the base portion, and has a second width that is measured in the transverse direction and is smaller than the first width,
        a head portion that is located outward from the shaft portion and has a third width that is measured in the transverse direction and is larger than the second width, and
        an aperture that is formed in the base portion and extends in the transverse direction.

2. The tool support structure of claim 1, wherein the aperture extends inward from an exterior surface of the base portion and toward the lug axis.

3. The tool support structure of claim 1, wherein a contoured surface is formed on the base portion of the lug and the contoured surface is in engagement with the tool rail.

4. The tool support structure of claim 3, wherein the contoured surface is arcuate.

5. The tool support structure of claim 4, wherein the tool rail has a cylindrical surface that is in engagement with the contoured surface of the base portion of the lug.

6. The tool support structure of claim 1, wherein the lug has a fastener aperture that extends along the lug axis through the base portion, the shaft portion, and the head portion, and a fastener is disposed in the fastener aperture and is connected to the tool rail.

7. The tool support structure of claim 1, wherein the tool rail extends in an axial direction, the tool rail has a first axial end, and the tool rail has a second axial end.

8. The tool support structure of claim 7, wherein the lug is connected to the tool rail such that the lug axis extends perpendicular to the axial direction of the tool rail.

9. The tool support structure of claim 7, further comprising:
    a first mounting portion that is connected to the tool rail at the first axial end of the tool rail such that the first mounting portion extends axially outward from the first axial end of the tool rail.

10. The tool support structure of claim 7, wherein the lug is connected to the tool rail at a location along the tool rail that is spaced between the first axial end of the tool rail and the second axial end of the tool rail.

11. A tool support structure for connection to a base, comprising:
    a tool rail; and
    a lug that has a lug axis, is connected to the tool rail, and is connectable to the base, the lug having:
        a base portion that is adjacent to the tool rail and has a first width that is measured in a transverse direction that extends perpendicular to the lug axis,
        a shaft portion that extends along the lug axis, is located outward from the base portion, and has a second width that is measured in the transverse direction and is smaller than the first width,
        a head portion that is located outward from the shaft portion and has a third width that is measured in the transverse direction and is larger than the second width, and
        a pin that is formed in the base portion and extends in the transverse direction.

12. The tool support structure of claim 11, wherein the pin extends outward from an exterior surface of the base portion and away from the lug axis.

13. The tool support structure of claim 11, wherein a contoured surface is formed on the base portion of the lug and the contoured surface is in engagement with the tool rail.

14. The tool support structure of claim 13, wherein the tool rail has a cylindrical surface that is in engagement with the contoured surface of the base portion of the lug.

15. The tool support structure of claim 11, wherein the lug has a fastener aperture that extends along the lug axis through the base portion, the shaft portion, and the head portion, and a fastener is disposed in the fastener aperture and is connected to the tool rail.

16. The tool support structure of claim 11, wherein the tool rail extends in an axial direction, the tool rail has a first axial end, and the tool rail has a second axial end, wherein the lug is connected to the tool rail such that the lug axis extends perpendicular to the axial direction of the tool rail.

17. The tool support structure of claim 16, further comprising:
    a first mounting portion that is connected to the tool rail at the first axial end of the tool rail such that the first mounting portion extends axially outward from the first axial end of the tool rail, wherein the lug is connected to the tool rail at a location along the tool rail that is spaced between the first axial end of the tool rail and the second axial end of the tool rail.

18. A mounting structure for connection to a base, comprising:
    a base portion that has a substantially circular cross-sectional shape that extends along an axis and has a first width that is measured in a transverse direction that extends perpendicular to the axis;
a head portion that has a substantially circular cross-sectional shape that extends along the axis and has a third width that is measured in the transverse direction;
a shaft portion that has a substantially circular cross-sectional shape that extends along the axis and has a second width that is measured in the transverse direction and is smaller than the first width and the third width, wherein the shaft portion connects the head portion to the base portion; and
at least one of a pin or an aperture that extends in the transverse direction.

19. The mounting structure of claim 18, wherein the at least one of a pin or an aperture is formed on the base portion.

20. The mounting structure of claim 18, wherein the at least one of a pin or an aperture is formed on the head portion.

* * * * *